United States Patent

[11] 3,627,358

| [72] | Inventor | John Ray Polston |
| | | 3346 South Wheeling, Tulsa, Okla. 74105 |
| [21] | Appl. No. | 876,894 |
| [22] | Filed | Nov. 14, 1969 |
| [45] | Patented | Dec. 14, 1971 |

[54] COUPLING FOR IMPERFORATE FLANGES
4 Claims, 4 Drawing Figs.

[52] U.S. Cl. ..................................................... 285/406,
285/178, 285/420
[51] Int. Cl. .............................................. F16l 23/00
[50] Field of Search........................................... 285/308,
364, 365, 406, 407, 420, 178, 410, 408, 409, 304,
310, 312; 24/263 B, 250, 258, 268, 273, 132 WL

[56] References Cited
UNITED STATES PATENTS

| 549,774 | 11/1895 | Forst.............................. | 24/250 |
| 1,518,479 | 12/1924 | Brewer........................... | 285/409 |
| 2,868,565 | 1/1959 | Suderow......................... | 285/406 X |
| 3,171,675 | 3/1965 | Calciano ........................ | 285/308 X |

FOREIGN PATENTS

| 204,231 | 11/1956 | Australia........................ | 285/366 |

Primary Examiner—Dave W. Arola
Attorney—Young & Thompson

ABSTRACT: Imperforate flanges are releasably coupled with a wedging action by a member that moves radially relative to the flanges and that has an arcuate recess having tapered sidewalls. The recessed member is engaged with and disengaged from the flanges by a rotatable cam and has a sliding connection that restrains its movement to movement in a plane parallel to the axis of the flanges.

PATENTED DEC 14 1971 3,627,358

INVENTOR.
John Ray Polston
BY Young & Thompson
ATTORNEYS.

COUPLING FOR IMPERFORATE FLANGES

The present invention relates to couplings for flanges, more particularly to couplings for flanges of the imperforate type in which the flanges are clasped together to form a joint but the flanges are not pierced by the coupling means. Couplings according to the present invention are useful wherever two circular flanges are to be releasably interconnected. Hence, these couplings can be used to interconnect sections of pipe, or a section of pipe and an end plate for closing the pipe, or in other environments; and accordingly, the term "flange" as used herein is not to be construed as limited to a pipe flange, but includes the marginal portions of other structures as well.

It is an object of the present invention to provide a coupling for flanges, which acts on a relatively large portion of the flange periphery so that only a small number of coupling devices need be employed in order to secure the joint.

Another object of the present invention is the provision of such a coupling, which grips the flanges together with great pressure but with good distribution of the pressure about the flanges.

Another object of the present invention is the provision of such a coupling, which can be readily moved out of the way of one or the other of the coupled members to permit lateral movement of the uncoupled members relative to each other.

Finally, it is an object of the present invention to provide such a coupling, which will be relatively simple and inexpensive to manufacture, easy to assemble, operate, maintain and repair, and rugged and durable in use.

Other objects and advantages of the present invention will become apparent from a consideration of the following description, taken in connection with the accompanying drawing, in which.

Figure 1:
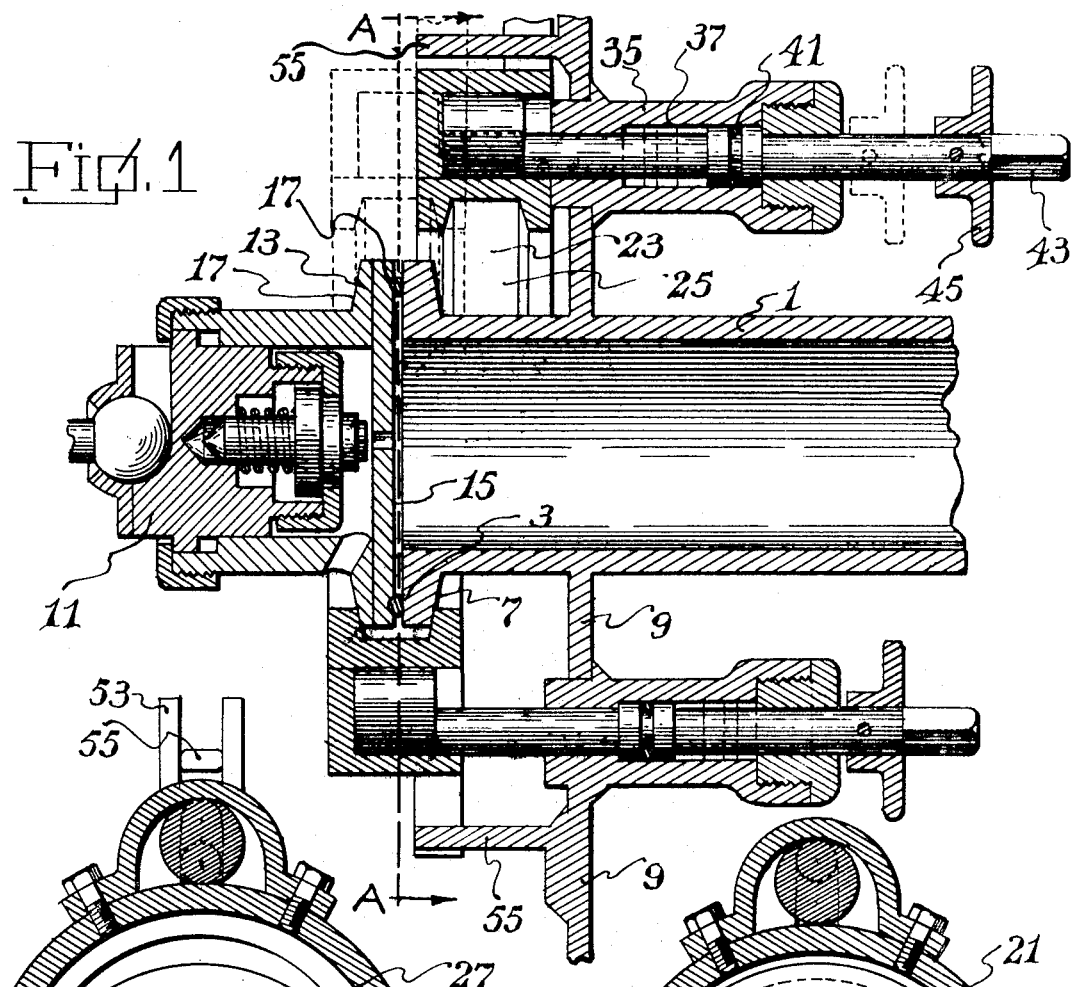
FIG. 1 is a cross-sectional view of a joint and coupling therefor in accordance with the present invention.

Referring now to the drawing in greater detail, there is shown a pipe 1 having a circular flange 3 at its end. Flange 3 has a flat end face 5 disposed in a plane perpendicular to the axis of the pipe, and a conically tapered face 7 on the side opposite end face 5. Pipe 1 is fixed in fluidtight relationship in a partition 9.

A closure member 11 closes the end of pipe 1 and has a circular peripheral flange 13 which can be identical to flange 3 and which includes a flat end face 15 disposed in a plane perpendicular to its axis and a tapered face 17 on the side of flange 13 which is opposite the end face 15. A seal in the form of an O-ring 19 or the like is disposed between the flanges 3 and 13.

The coupling means of the present invention comprises at least one arcuate yoke 21 whose arcuate extent is not more than 180°, preferably a little less than 180°, and preferably more than 90°. Yoke 21 has an arcuate recess 23 therein which has an arcuate bottom wall 25 and arcuate truncated conical side walls 27. Sidewalls 27 are congruent with tapered faces 7 and 17 of flanges 3 and 13.

A rotary cam 29 is provided, for moving yoke 21 toward and away from the flanges. Cam 29 has an arcuate cam face 31 which is preferably cylindrical because cylindrical is easier to produce by machining. An eccentric camshaft 33 is integral with cam 29 and extends parallel to the axis of pipe 1. A sleeve 35 fixedly secured to partition 9 provides slidable support at axially spaced points for camshaft 33. Sleeve 35 has a cylindrical chamber 37 therein which receives an enlargement on cam shaft 33 in the form of a piston 39 which carries an annular seal in the form of an O-ring 41 that bears against the walls of chamber 37 to seal against the leakage of fluid from one side of partition 9 to the other side of partition 9. The end of camshaft 33 opposite cam 29 is squared as at 43 for rotation by a wrench; and this same end of shaft 33 carries an enlargement 45 which provides purchase for pushing or pulling cam shaft 33 to slide axially in sleeve 35.

Cam 29 is received in a cam housing 47 which is secured to yoke 21 by means of bolts 49. Housing 47 is provided with a slot 51 at one side thereof to receive camshaft 33 and is closed at its other side. Cam face 31 has slidable bearing contact along at least one line with the interior of housing 47 and with the exterior of yoke 21. Of course, yoke 21 and/or housing 47 can be provided with curved bearing surfaces complementary to cam face 31 to extend the area of contact of cam face 31 and distribute the stress loads over as much of the area of cam face 31 as is desired.

Cam housing 47 has a fork 53 integral therewith that extends radially of the axis of the pipe and parallel to slot 51 and that receives a key 55 in the form of a finger which is fixedly secured to partition 9 and that permits movement of cam housing 47 only in a plane parallel to the plane that includes key 55 and the axis of pipe 1, and that prevents any rotation of housing 47.

Figures 2, 3:
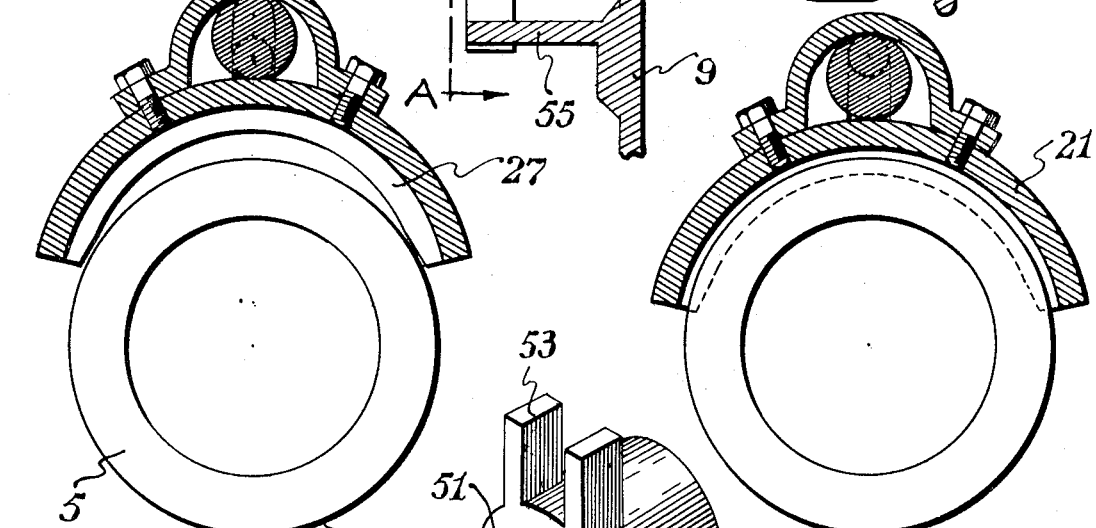
FIG. 2 is a cross-sectional view of the parts in the uncoupled position, taken on the line A—A of FIG. 1.
FIG. 3 is a view similar to FIG. 2, but showing the parts in the coupled position.
Figure 4:
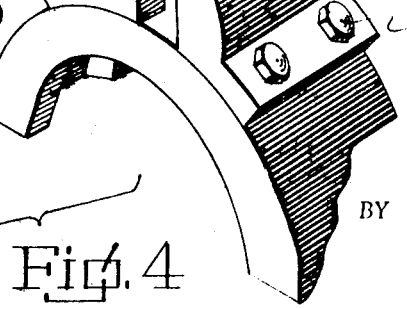
FIG. 4 is a fragmentary exploded perspective view of a coupling member and actuating cam according to the present invention.

In operation, flanges 3 and 13 are juxtaposed as shown in FIG. - and yoke 21 is moved to its dotted line position shown in FIG. 1 by pressing on enlargement 45 until it occupies its dotted line position in FIG. 1. Cam shaft 33 slides in sleeve 35 to accommodate this adjustive movement. Then, a wrench is applied to the squared end of camshaft 33 and shaft 33 is rotated thereby to rotate cam 29 so that yoke 21 moves radially inwardly to its lower full-line position in FIG. 1, that is, from the position of FIG. 2 to the position of FIG. 3. During this movement, the sidewalls 27 of yoke 21 contact tapered faces 7 and 17 of flanges 3 and 13 with a wedge action that forces the flanges toward each other and tightly seals the coupling. The tighter the seal, the more of the area of sidewalls 27 is in contact with tapered faces 7 and 17 so that the unit area interfacial pressure between the flanges and the coupling does not increase as rapidly as the total pressure. It will be noted that key 55 sliding in the fork 53 permits the axial adjustive movement of yoke 21 and the radial movement of yoke 21 but prevents any other movement of yoke 21.

To uncouple the flanges, the reverse procedure is followed. When the yoke 21 has been moved from the FIG. 3 position back to the FIG. 2 position, then it may be pulled from its dotted line position in FIG. 1 to its upper full-line position in FIG. 1 so as completely to clear the plane of the joint thereby to permit closure member 11 to be moved perpendicular to the axis of pipe 1 if desired and in any event to retract yoke 21 to a relatively safe position where it will not likely be damaged.

It will of course be understood that not less than two yokes 21 are to be employed, and that more than two may be employed as desired, depending on the size of the flanges. The above description of the structure and operation of one yoke 21, however, suffices for all.

In view of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of this invention, as those skilled in this art will readily understand. Such modifications and variations are considered to be within the purview and scope of the present invention as defined by the appended claims.

Having described my invention, I claim:

1. A flange coupling comprising a yoke having an arcuate recess therein having oppositely tapered sidewalls for engaging and pressing together opposite surfaces of tapered annular flanges to be joined together, and rotary cam means for moving the yoke into and out of coupling relation with the flanges, said yoke having a recess therein for rotatably receiving said rotary cam means, and an eccentric cam shaft for rotating said cam means, said camshaft being parallel to the axis of the annular flanges.

2. A coupling as claimed in claim 1, and slidable bearing means for said camshaft, said camshaft being rotatable in said bearing means and slidable in said bearing means parallel to said axis thereby to move said yoke parallel to said axis.

3. A coupling as claimed in claim 2, and means restricting movement of said yoke to movement in a plane including said axis.

4. A coupling as claimed in claim 1, said recess extending from 90° to 180° about said axis.

* * * * *